US006979120B1

(12) United States Patent
Wolfe

(10) Patent No.: US 6,979,120 B1
(45) Date of Patent: Dec. 27, 2005

(54) ARTICLE OF MANUFACTURE HAVING NON-UNIFORM THERMOCHROMIC DISPLAY

(76) Inventor: Wynn Wolfe, 830 Cortez Rd., Arcadia, CA (US) 91007

(*) Notice: Subject to any disclaimer, the term of this patent is extended or adjusted under 35 U.S.C. 154(b) by 55 days.

(21) Appl. No.: 10/740,158

(22) Filed: Dec. 18, 2003

Related U.S. Application Data

(60) Provisional application No. 60/434,735, filed on Dec. 18, 2002, provisional application No. 60/473,686, filed on May 28, 2003.

(51) Int. Cl.[7] .......................... G01K 11/12; G01K 3/04
(52) U.S. Cl. ....................... 374/162; 374/157; 116/216
(58) Field of Search ................................ 374/100, 102, 374/161, 162, 159, 137, 150, 208; 116/206, 116/216

(56) References Cited

U.S. PATENT DOCUMENTS

| 4,156,365 | A | * | 5/1979 | Heinmets et al. ........... 374/162 |
| 4,554,565 | A | | 11/1985 | Kito et al. |
| 5,202,677 | A | | 4/1993 | Parker et al. |
| 5,223,958 | A | | 6/1993 | Berry |
| 5,282,683 | A | * | 2/1994 | Brett .......................... 374/150 |
| 5,482,373 | A | * | 1/1996 | Hutchinson ................. 374/141 |
| 5,805,245 | A | | 9/1998 | Davis |
| 6,126,313 | A | | 10/2000 | Schiller |
| 6,281,165 | B1 | * | 8/2001 | Cranford ..................... 503/226 |
| 6,386,756 | B1 | * | 5/2002 | Rice ............................ 374/157 |
| 6,405,867 | B1 | | 6/2002 | Moore |
| 6,579,006 | B1 | * | 6/2003 | Pariseau ...................... 374/162 |
| 6,594,927 | B2 | * | 7/2003 | Witkowski ................... 40/310 |
| 2001/0043469 | A1 | * | 11/2001 | Carpenter et al. ........... 362/161 |
| 2002/0062691 | A1 | * | 5/2002 | Meyers et al. ............... 73/426 |
| 2002/0097777 | A1 | * | 7/2002 | Ronci .......................... 374/157 |
| 2002/0167989 | A1 | * | 11/2002 | Russo .......................... 374/141 |
| 2003/0000451 | A1 | * | 1/2003 | Wilcox ........................ 116/207 |
| 2003/0127415 | A1 | * | 7/2003 | Carballido .................. 215/230 |

FOREIGN PATENT DOCUMENTS

NL            9101419 A    *  3/1993   ............. A61J 9/02

* cited by examiner

Primary Examiner—Gail Verbitsky
(74) Attorney, Agent, or Firm—Christie, Parker & Hale, LLP.

(57) ABSTRACT

A beverage container has a wall with a thickness that progresses from relatively thinner to relatively thicker in a selected direction that travels around the container. A permanent graphics pattern is applied to the outer surface of the wall to progress in the same direction across the container. A layer of thermochromic ink is applied to the outer surface of the container wall to initially mask the graphics pattern (or at least portions thereof) progressing across the container wall. The thermochromic ink layer is of a composition that reacts to heat or cold and changes from opaque to transparent when the temperature transferred to it through the wall of the container changes to a relatively higher or relatively lower transition temperature. The gradient in wall thickness of the container causes a non-uniform transfer of thermal energy to the thermochromic layer, causing the thermochromic mask to disappear at a controlled rate, thereby causing the graphics pattern underneath to be revealed in a time-delayed sequence that reveals elements of the graphics pattern that progress across the container wall in a left-to-right, or right-to-left, or down-to-up, or up-to-down time-related sequence.

16 Claims, 6 Drawing Sheets

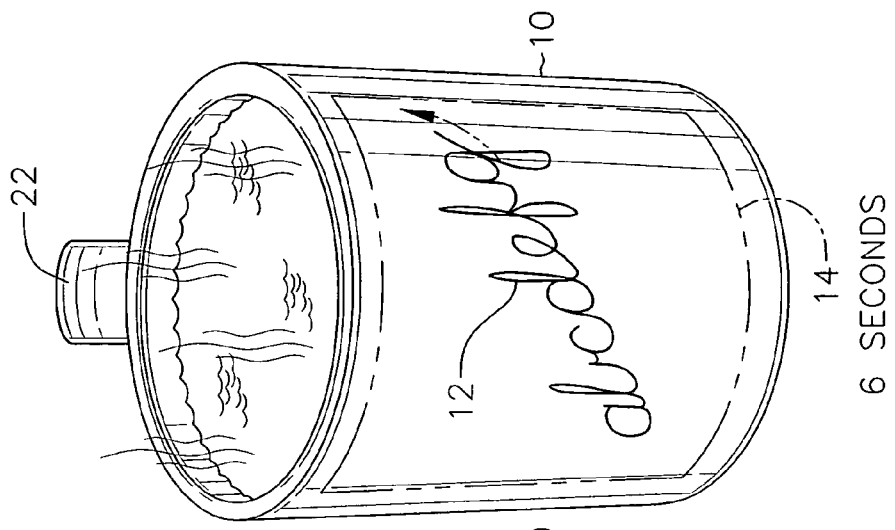
FIG.2  2 SECONDS
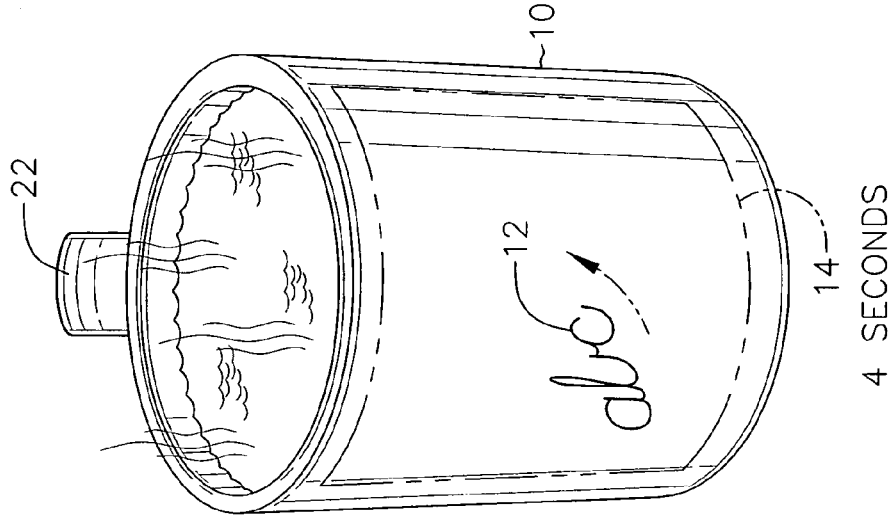
FIG.3  4 SECONDS
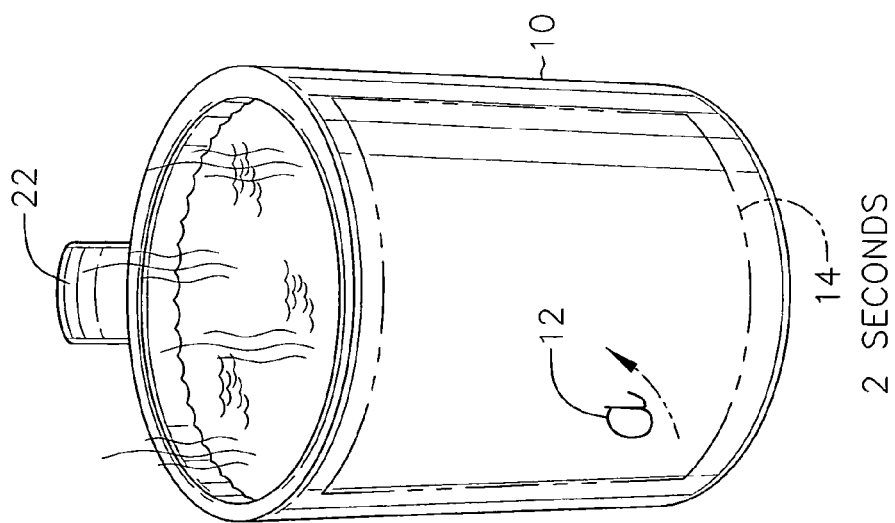
FIG.4  6 SECONDS

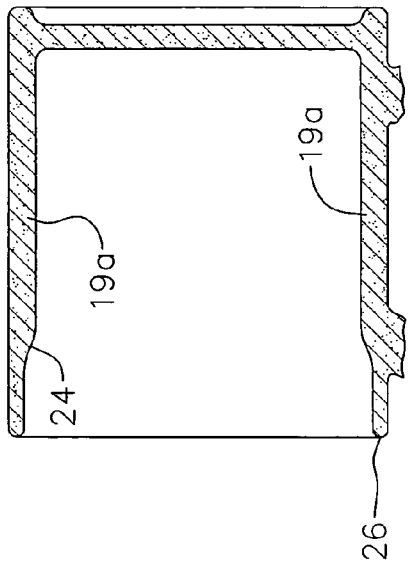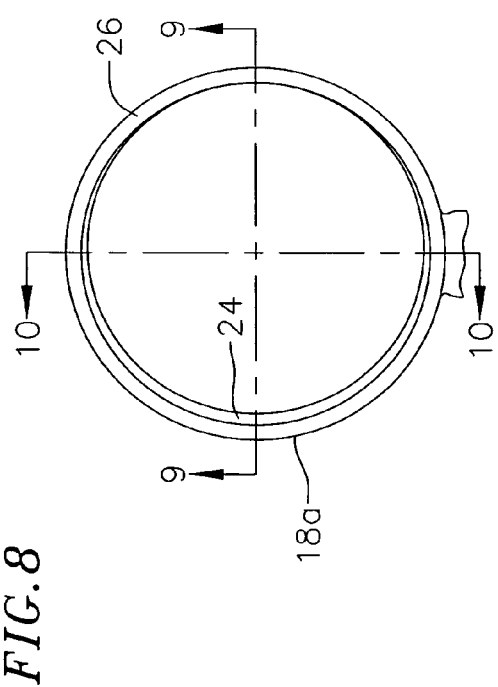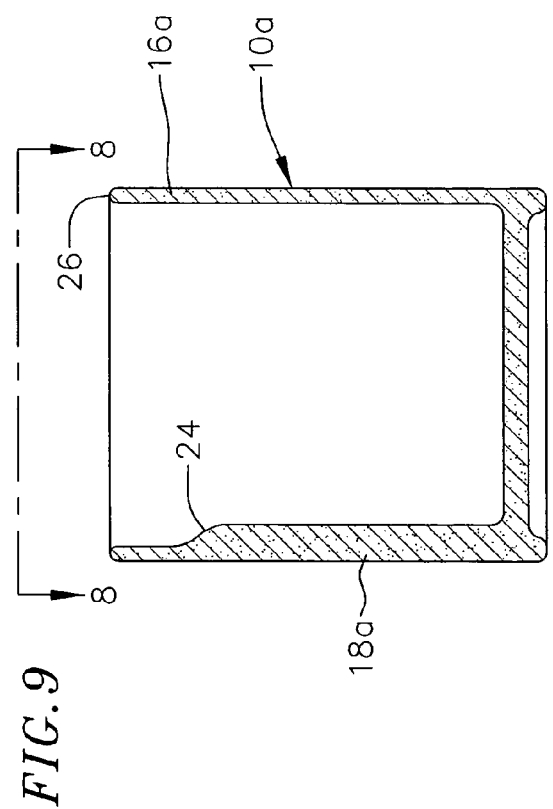

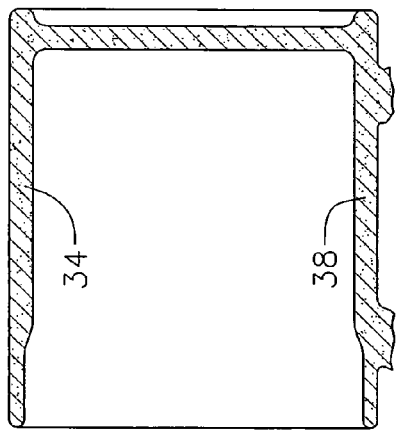
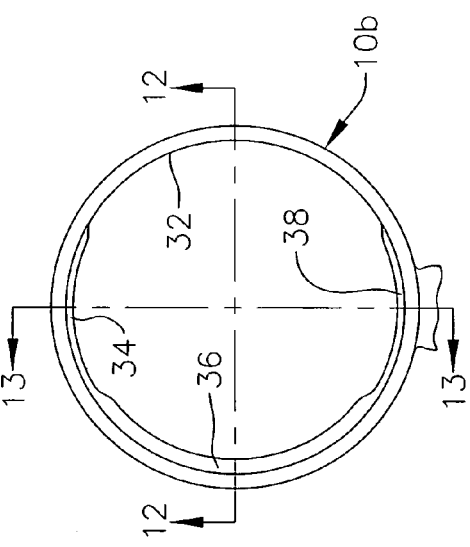
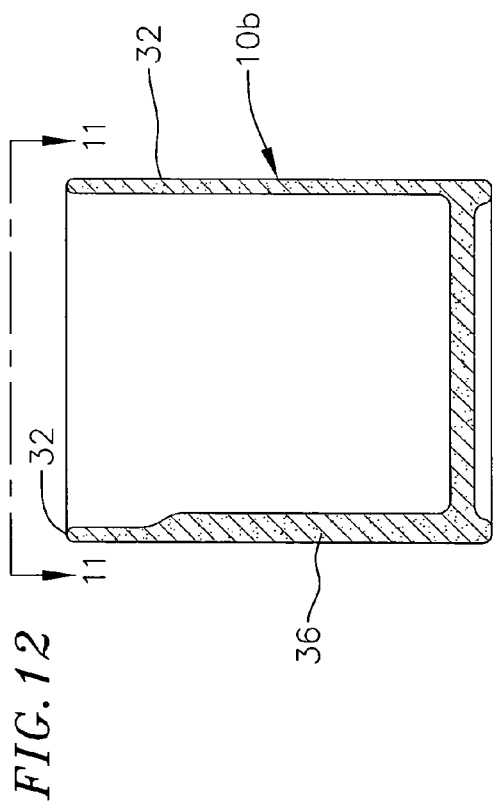

ARTICLE OF MANUFACTURE HAVING NON-UNIFORM THERMOCHROMIC DISPLAY

CROSS-REFERENCE TO RELATED APPLICATIONS

This application claims the priority of my first provisional application No. 60/434,735, filed Dec. 18, 2002, and the priority of my second provisional application No. 60/473,686, filed May 28, 2003. Both applications are incorporated herein by reference.

FIELD OF THE INVENTION

This invention relates to containers for holding beverages, and more particularly, to a container having a non-uniform thermal-activated thermochromic display.

BACKGROUND

Thermochromic materials such as thermochromic ink layers can be applied to a substrate as image layers that hide a non-thermochromic image. Application of heat can cause the thermochromic layers to reach their transition temperatures at which they change state from opaque to transparent or colorless, for example. Different thermochromic materials (in different colors, for example) can have different transition temperatures. Thermochromic materials are disclosed in U.S. Pat. No. 5,202,677 to Parker et al., U.S. Pat. No. 5,805,245 to Davis, and U.S. Pat. No. 5,223,958 to Berry, which are incorporated herein by reference. A ceramic beverage holding cup having a thermochromic time-sequence display is disclosed in U.S. Patent Publication 2002/0097777 to Ronci, also incorporated herein by reference.

SUMMARY OF THE INVENTION

Briefly, one embodiment of the invention comprises an article of manufacture such as a container for hot liquid drinks in which the container has a non-uniform (time-lapse) thermochromic image display. The invention creates a thin-to-thick walled ceramic mug substrate for subsequent application of a permanent graphics image pattern covered by hide-and-reveal thermochromic ink—also known as "magic ink."

More specifically, one embodiment of the invention comprises a container having a wall with a thickness that progresses from relatively thinner to relatively thicker in a selected direction that travels around the container wall. A graphics image pattern is applied to the outer wall surface of the container to progress in the same general direction across the face of the container. A layer of thermochromic ink is applied to the outer wall of the container to initially mask the graphics pattern (or at least portions thereof) progressing across the face of the container wall. The thermochromic ink layer is of a composition that reacts to heat and becomes transparent when the temperature transferred to it through the wall of the container exceeds a pre-determined relatively higher transition temperature. When the wall temperature of the container progress from a relatively lower temperature (say at room temperature) to a relatively higher temperature, the gradient in wall thickness of the container causes the graphics pattern to be revealed in a time-delayed sequence that reveals elements of the pattern that can progress across the face of the container in a left-to-right or right-to-left or down-to-up or up-to-down time sequence.

As mentioned, the invention can be carried out with beverage containers made of ceramic materials and containing hot liquids which trigger the hide-and-reveal image sequence. Alternatively, the invention can be carried out with containers of plastic or glass molded to the same non-uniform shape. Further, the invention can be used with containers holding ice cold beverages. In this instance, when the wall of the container progresses from a relatively higher temperature (say at room temperature) to a relatively lower temperature, the hide-and-reveal image sequence is triggered by a relatively lower transition temperature that causes the thermochromic mask to disappear with a selected low temperature-controlled time delay.

Referring to one embodiment of the invention in which a hot liquid drink is poured into the container, the offset configuration (the gradient in wall thickness) constitutes a heat-driven thermal conductor that causes the lateral left-to-right (or right-to left) revelation of hidden graphic elements printed beneath the initially opaque thermochromic ink mask. Where the wall is thinnest the graphic image will appear first, and where the wall is thickest the image will appear sequentially last. (The gradient in wall thickness actually retards heat transfer over time to the thermochromic mask layer on the front face of the container.) The display can be continuous in real time, in a manner similar to hand-writing or sky writing, for example, or it can comprise a step-function time sequence.

These and other aspects of the invention will be more fully understood by referring to the following detailed description and the accompanying drawings.

BRIEF DESCRIPTION OF THE DRAWINGS

FIGS. 2, 3 and 4 are semi-schematic perspective views illustrating a beverage container, according to principles of this invention, in a time-lapse sequence that progressively reveals graphics images on the container triggered by heat transfer to a thermochromic material.

FIG. 8 is a top view showing the wall configuration of a container having a smooth transition in wall thickness.

FIG. 9 is a cross-sectional view taken on line 9—9 of FIG. 8.

FIG. 10 is a cross-sectional view taken on line 10—10 of FIG. 8.

FIG. 11 is a top elevational view showing an alternative form of the invention in which the gradient in wall thickness is formed as a series of steps.

FIG. 12 is a cross-sectional view taken on line 12—12 of FIG. 11.

FIG. 13 is a cross-sectional view taken on line 13—13 of FIG. 11.

DETAILED DESCRIPTION

FIGS. 1–4 illustrate a container for beverages such as a cup or coffee mug 10. A front side of the mug is shown with a graphics display having a fixed image which can be masked off by a region of thermochromic ink. The display is illustrated as alphabet letters 12 in various stages of being revealed as the thermochromic ink mask (shown in phantom lines at 14) disappears in a time delay of 2, 4 and 6 seconds, for example. The graphics display is preferably on a front face of the container opposite a handle 22 at the rear side of the container.

Figure 1:
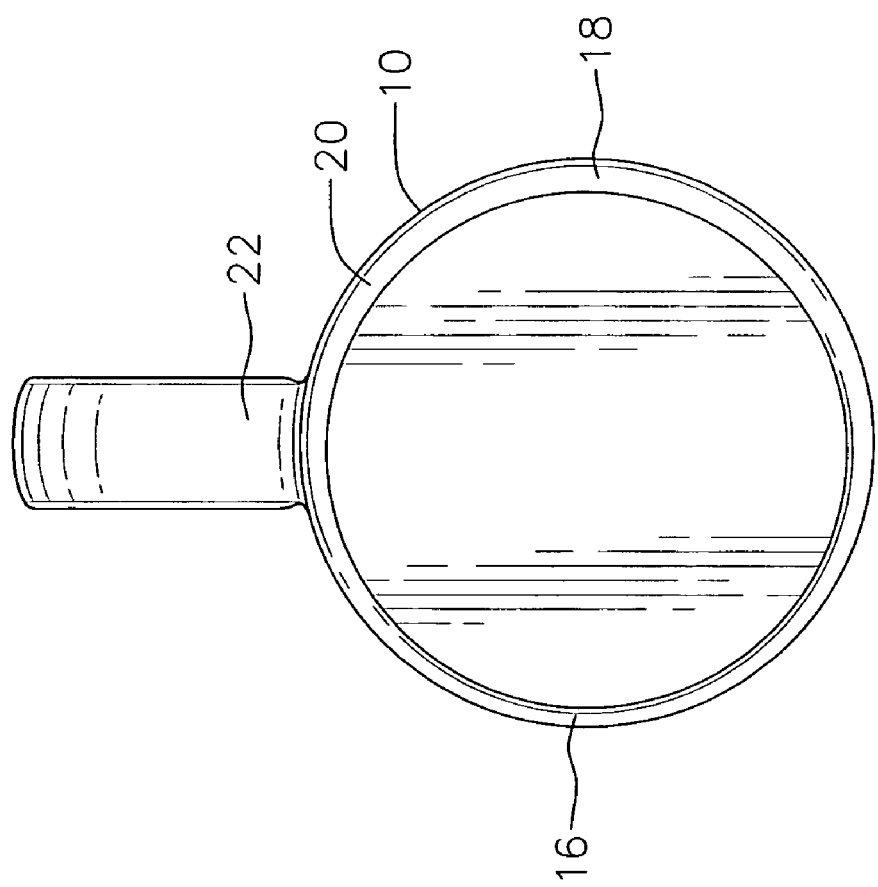
FIG. 1 is a top view of a container according to principles of this invention.

FIG. 1 illustrates a means for producing the time delay progression of revealing the graphics images on the container 10. The container wall has a progressive variation in wall thickness that varies from relatively thinner at 16 to relatively thicker on an opposite side at 18. The wall thickness uniformly increases in the counter-clockwise direction shown in FIG. 1, but tapers back to a relatively thinner wall thickness at 20, near the handle 22.

In one embodiment, the handle 22 of the container 10 is located at a pre-determined centerline that creates essentially equal hemispheres or radii of the thin-to-thick wall (see top view of FIG. 1). The handle 22 denotes the mug's backside, while the diametrically opposite side becomes the container's front center. For example, the front elevation is the staging or live area for any and all special effect graphics elements that, by virtue of the wall configuration, will be sequentially revealed from left-to-right, up-to-down, center-to-circumference, or vice versa. The graphics image is initially applied permanently to the container and covered by the opaque thermochromic ink layer 14 which can be in a variety of monochromatic colors. The thermochromic ink layer disappears as the temperature of the wall increases (or decreases) to a preset transition temperature established by the chemical formulation of the thermochromic ink.

Measurable physics of thermal conductors reveals that when a hot liquid (a triggering element for the thermochromic or magic ink) is poured into the thermochromic ink-treated mug, the heat rises within the mug's wall in an evenly vertical and essentially uniform manner. However, within the thin-to-thick substrate (front elevation), the heat will rise along the wall from left to right (owing to the gradient in wall thickness progressing in the counter-clockwise direction of the illustrated example). Simultaneously, the heat will also rise in the wall at approximately forty-five degrees (45°) starting from front left base to front right top, thereby causing or animating all hidden graphics elements within the staging or live area to appear to move counter-intuitively across the face of the mug as the heat travels and causes the thermochromic ink to progressively disappear over time.

Thermochromic ink is a material that is applied as a coating over the graphics images which are printed on the container. The thermochromic ink layer will initially mask the underlying graphics pattern when the wall of the container is at normal ambient (room-temperature) temperature conditions, say 68° F. to 80° F., as an example. The normally opaque character of the thermochromic ink layer is transformed into a transparent condition progressively over time after heat is transferred to the container interior such as from a hot liquid, to the region where the thermochromic layer is positioned.

In other embodiments, the thermochromic ink layer can exhibit a color change when its temperature increases or changes. The thermochromic ink layer can be controlled as to the temperature which activates the temperature or color changing phase of the thermochromic coating. In one embodiment of the invention, the thermochromic ink layer can be initially activated at about 140° F. (This would be the transition temperature of the thermochromic ink layer which rises when heat from the hot liquid induces heat buildup in the container wall over time.) Thermochromic ink is well known in the graphics arts and is available, for example, from Chromatic Technologies, Inc., Colorado Springs, Colo., and Color Change Corporation, Chicago, Ill.

Figure 6:
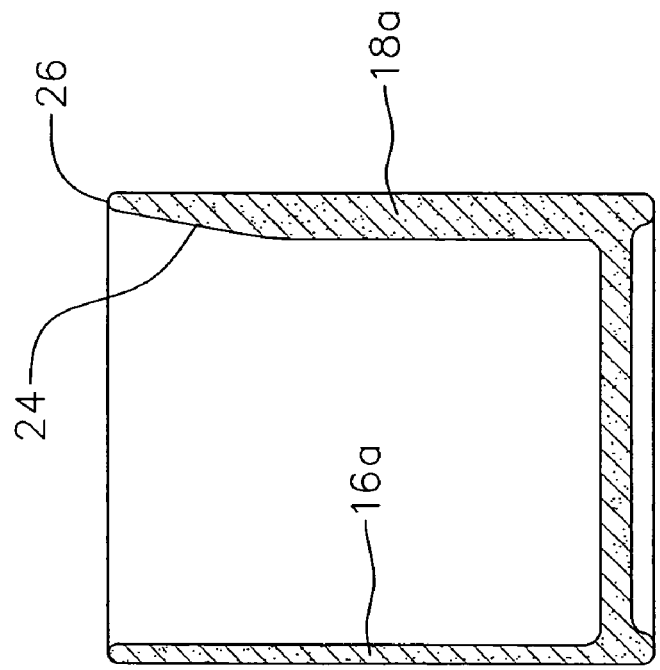
FIG. 6 is a cross-sectional view taken on line 6—6 of FIG. 5.
Figure 5:
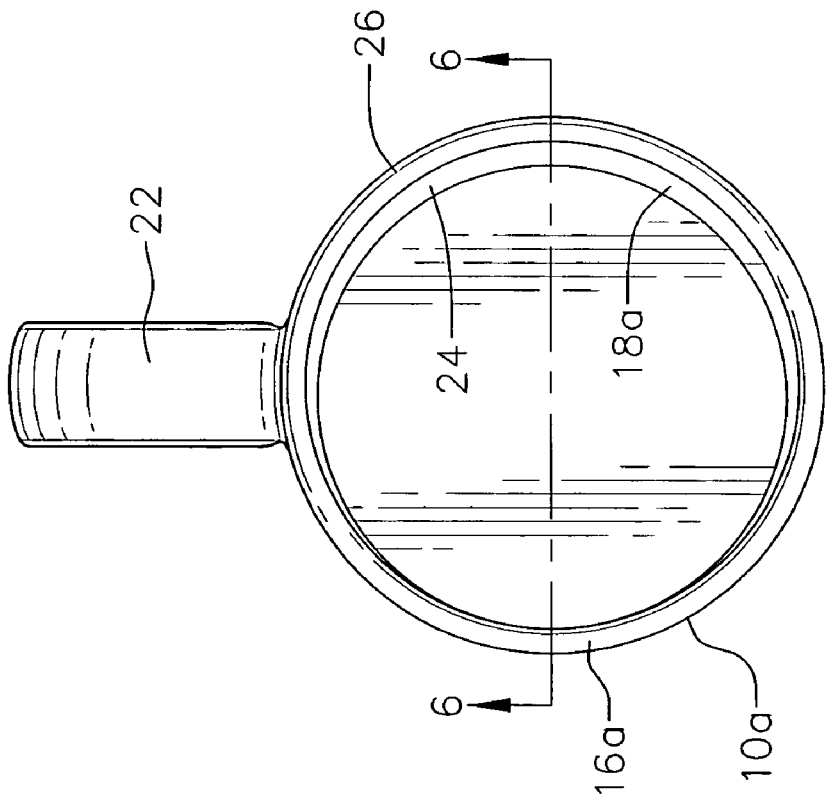
FIG. 5 is a top view showing an alternate form of the invention.

The illustration in FIGS. 5 and 6 shows an embodiment in which a top inside wall 24 of the container 10a is tapered for about one-half of the diameter around the inside of the container. The taper leaves an essentially uniform thickness along a top edge 26 around the container to create a uniform rim (approximately ⅛ inch in thickness), thereby disguising the variation in wall thickness below it that produces the time-lapse movement of images revealed after the container is filled with a hot liquid, for example. The progression in wall thickness below the taper 24 is shown from wall section 16a to wall section 18a. In one embodiment, the taper is about ¾ inch below the top edge 26 of the container.

Figure 7:
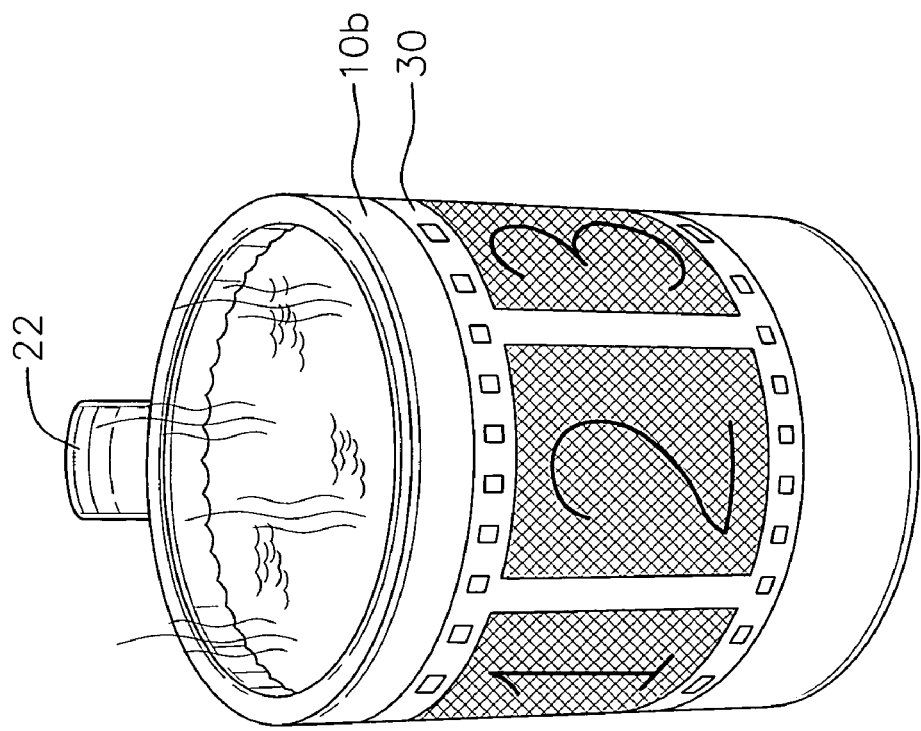
FIG. 7 is a semi-schematic perspective view showing an example of a graphics pattern which comprises an image representing frames of film that can be revealed in a time delay sequence of steps, owing to the stepwise non-uniform construction of the container wall and the triggering of the thermochromic ink layer that initially masks the film strip.

The illustration in FIG. 7 shows an embodiment in which an image of a film strip 30 in separate frames (nos. 1, 2 and 3) show a sequence of action scenes revealed from left to right across the container as the triggering temperature in that direction increases. The film's frames are each initially covered with thermochromic ink and the ink layer disappears in a time delay which reveals the frames in a stepwise sequence of images that appear to move across the container to resemble a movie's animation sequence.

FIG. 8 is a top view of a container similar to that shown in FIGS. 5 and 6 in which the gradient in wall thickness is formed by a smooth transition from relatively thinner on one side to relatively thicker on the other side of the container. The cross-section of FIG. 9 shows the gradient in wall thickness which transitions from a relatively thinner wall thickness at 16a to a relatively thicker dimension on an opposite side of the container at 18a. The cross-sectional view shows the tapered wall at 24 and the rim 26 of uniform thickness at the top of the container. FIG. 10 shows the container wall having a wall thickness of medium dimension at a plane extending at a right angle to the cross section shown in FIG. 9. In one embodiment of a container having the configurations shown in FIGS. 8 through 10, the minimum wall thickness 16a of a ceramic mug is 0.118 inch, the maximum wall thickness at 18a is 0.297 inch and the wall thickness of medium dimension at 19a is 0.209 inch.

FIG. 11 is a top elevational view showing the container 10b having a gradient in wall thickness which changes in a series of steps. This form of the invention is used to produce a film strip sequence similar to FIG. 7 in which the images are revealed in a series of steps rather than as a smooth transition. FIG. 11 shows a first section 32 of the container wall having a dimension of minimum thickness. Progressing in a counter-clockwise direction, the container wall steps up to second section 34 having a thickness which is greater than the first section, followed by a third section 36 of maximum thickness on a side of the container opposite from the first section 32. The section 36 then steps down to a fourth section 38 approximately the same thickness as the second section 34, which is on the opposite side of the container. Each of the wall sections 32, 34, 36 and 38 is of uniform thickness from one side to the other. The images being revealed in a manner similar to a film strip would be placed on the front face of the container at sections 32, 34 and 36 so as to be revealed in a stepwise pattern when the temperature of the container wall rises to the transition temperature of the thermochromic ink mask as described previously.

The invention has been described with respect to a container which can be made from ceramic materials, but the invention also can be carried out with containers made of plastic or glass. The invention made by any of these materials also can be carried out with variations in wall thickness in a variety of other gradients to produce any desired time delay sequence of revealing the hidden permanent graphics images. And as mentioned, the invention is operative as a thermal conductor generally, and when made from any of the foregoing materials can be used as effectively with ice cold beverages as well as hot beverages.

The construction of a standard drinking container (uniform wall structure) hiding and revealing an underlying graphic design is and has been available from Wynn Wolfe originALLs, LLC, Arcadia, Calif., and is publicly shown over the related web site, originalls.com. The technology involved in manufacturing such a standard drinking container is incorporated herein by this reference.

What is claimed is:

1. A beverage container having a wall with a thickness gradient that progresses from relatively thinner to relatively thicker in a selected direction that travels around the container wall, a graphics pattern applied to the outer wall surface of the container to progress generally in the same direction across the container wall, a layer of thermochromic ink applied to the outer wall surface of the container to initially mask at least a portion of the graphics pattern progressing across the container wall, when the wall temperature of the container is at an initial temperature, the thermochromic ink layer being of a composition that reacts to thermal change and becomes transparent when the temperature transferred to it through the wall of the container reaches a transition temperature different from the initial temperature, the gradient in wall thickness of the container causing the graphics pattern to be revealed in a time delayed sequence that reveals elements of the graphics pattern in a real time progression across the face of the container.

2. Apparatus according to claim 1 in which the container has a handle attached at generally along an axis that divides the container into generally equal hemispheres, and the graphics pattern is located across the face of each hemisphere.

3. Apparatus according to claim 1 in which the ink thermochromic layer is applied to the container wall and the wall thickness varies so that the revealed graphics pattern progresses in time across the face of the container in an angularly upward time sequence.

4. Apparatus according to claim 1 in which the gradient in wall thickness causes the graphics elements to be revealed in a left-to-right, or right-to-left or down-to-up or up-to-down time sequence.

5. Apparatus according to claim 1 in which an upper portion of the container is tapered to form a generally uniform thickness upper rim around the circumference of the container.

6. Apparatus according to claim 1 in which the graphics pattern reveals a film scene sequence similar to a movie.

7. Apparatus according to claim 1 in which the graphics pattern, or at least a portion of it, changes color when the temperature of the container wall changes.

8. Apparatus according to claim 1 in which the container is made of a ceramics material.

9. Apparatus according to claim 1 in which the container is made of a plastic material.

10. Apparatus according to claim 1 in which the container is made of a glass material.

11. Apparatus according to claim 10 in which the transition temperature is below the initial temperature.

12. A beverage container having a wall section with a wall thickness that progresses from relatively thinner to relatively thicker in a selected direction that travels across the container wall, a graphics pattern applied to the wall of the container to progress generally in the same direction across the container wall, a layer of thermochromic ink applied to the outer wall surface of the container to initially mask at least portions of the graphics pattern progressing across the container wall, when the wall temperature of the container is at a relatively lower temperature, the thermochromic ink layer being of a composition that reacts to heat and becomes transparent when the temperature transferred to it through the wall of the container exceeds a predetermined relatively higher transition temperature, the gradient in wall thickness of the container causing the graphics pattern to be revealed in a time delay sequence that reveals elements of the graphics pattern that progress across the face of the container in a time delay sequence.

13. Apparatus according to claim 12 in which the container has a handle attached at generally along an axis that divides the container into generally equal hemispheres and the graphics pattern is located across the face of each hemisphere.

14. Apparatus according to claim 12 in which the thermochromic ink layer is applied and the wall thickness varies so that the revealed graphics pattern progresses in time across the face of the container in an angularly upward time sequence.

15. Apparatus according to claim 12 in which the gradient in wall thickness causes the graphics elements to be revealed in a left-to-right, or right-to-left or down-to-up or up-to-down time sequence.

16. Apparatus according to claim 12 in which an upper portion of the container is tapered to form a generally uniform thickness upper rim around the circumference of the container.

\* \* \* \* \*